United States Patent [11] 3,630,493

[72] Inventor Poerio Carpigiani
     Bologna, Italy
[21] Appl. No. 865,602
[22] Filed Oct. 13, 1969
[45] Patented Dec. 28, 1971
[73] Assignee Apaw S.A.
     Fribourg, Switzerland
[32] Priority Oct. 22, 1968
[33] Italy
[31] 7416 A/68

[54] AUTOMATIC MACHINES FOR THE BATCHWISE PRODUCTION OF ICE CREAM
5 Claims, 1 Drawing Fig.

[52] U.S. Cl. .................................................. 259/106
[51] Int. Cl. .................................................. B01f 7/00
[50] Field of Search .......................................... 259/106,
      5–9, 16, 21–27, 32–35, 40–46, 64–69, 1, 122, DIG. 34, DIG. 3; 107/14

[56] References Cited
UNITED STATES PATENTS

| | | | |
|---|---|---|---|
| 1,352,984 | 9/1920 | Miller .................... | 259/DIG. 34 |
| 2,577,916 | 12/1951 | Rollman ................ | 259/DIG. 34 |
| 1,956,622 | 5/1934 | Parker ................... | 259/107 X DIG. 34 |
| 2,278,340 | 3/1942 | Weinreich et al. ...... | 259/DIG. 32 |

Primary Examiner—Patrick D. Lawson
Assistant Examiner—Geo. V. Larkin
Attorney—Edwin E. Greigg ABSTRACT: The invention relates to machines for batchwise mixing, especially small ice cream machines comprising a fixed container or freezing can with a slidable bottom plate and a rotatable dasher, and means for lifting said slidable bottom plate, together with the ice cream resting on it, by reversing the dasher-revolving direction and lowering the bottom plate by resuming the driving of the machine in a dasher-revolving direction.

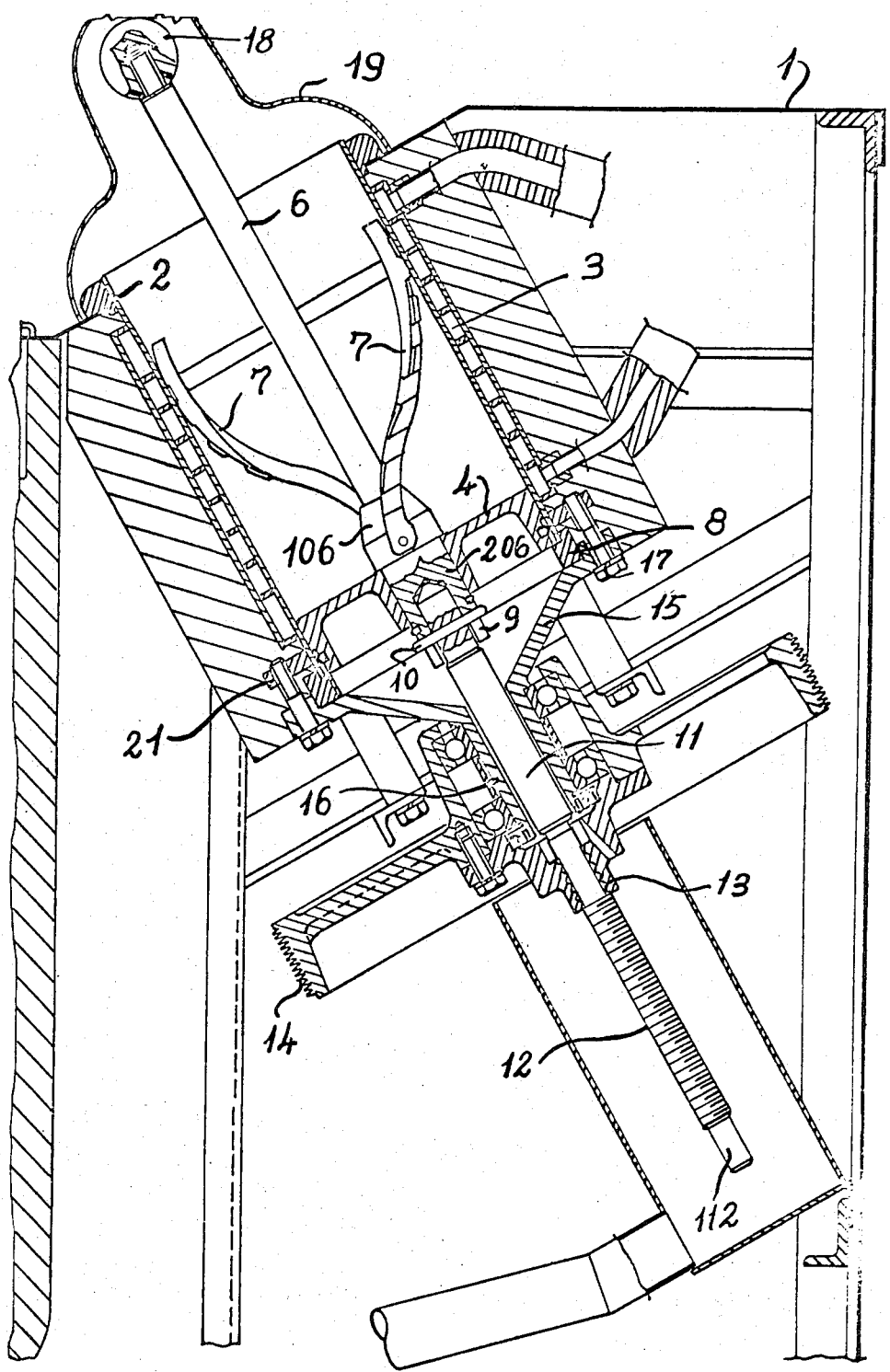

AUTOMATIC MACHINES FOR THE BATCHWISE PRODUCTION OF ICE CREAM

This invention relates to improvements in machines for batchwise mixing, and relates specifically to improvements in automatic ice cream machines for the processing of batches of ice cream, often used in small communities, hotels, and large families. Such machines comprise a fixed cylindrical freezing can and a pistonlike axially through bored bottom plate. The latter is slidably mounted in said can and carries a rotatable agitator and scraper, usually called a dasher. The dasher is provided with a shaft extending downwardly through the freezing can and through said bottom plate hole is driven by driving means. The bottom plate can be removed from said can together with the ice cream resting upon the bottom plate, as soon as the ice cream is prepared.

The main object of the invention is to provide means for automatically lifting in a mixing container a bottom plate and a dasher unit together with the mixed product resting upon the bottom plate to facilitate the removal of the mixed product and for again automatically inserting into said container the bottom plate and dasher unit, after removal of the product.

The invention will be described hereinafter as applied to a preferred embodiment of an ice cream machine in which the freezing can comprises an open-ended cylinder, surrounded by a conventional freezing coil and closed at its bottom end by a pistonlike slidable bottom plate constituting the container can bottom, however it is to be understood that the same can be used in any other kind of conventional or known ice cream machines having a fixed freezing can provided with a through bored bottom plate and a dasher unit rotatably mounted therein, the bottom plate and the dasher unit being mounted on a shaft operatively connected to driving means.

The preferred embodiment of the invention will now be described with reference to the accompanying drawing, showing a vertical partial cross section of the fixed freezing can and the rotatable dasher unit of a small automatic ice cream machine provided with means for automatically lifting the dasher unit, the bottom plate and the ice cream mix thereon in the freezing can and for lowering the dasher unit and the bottom plate again into the can when the ice cream has been removed and the bottom plate cleansed.

In the drawing, 1 denotes a part of a conventional ice cream machine cabinet in which a fixed freezing can is mounted. This can comprises a fixed cylindrical wall or cylinder 2 surrounded by a cold-generating expansion coil 3 of a conventional refrigerating unit (not shown) and covered by a conventional insulating jacket. The cylinder 2 is provided with a pistonlike bottom plate 4 slidably mounted with a tight fit in said cylinder 2 and forming together the freezing can 2–4.

A ring 8 fitted forming an abutment means under said cylinder 2 is provided to limit the downward movement of the bottom plate.

The bottom plate 4 is provided with an axial cylindrical through bore through which the downwardly extending cylindrical section 206 of a larger diameter hub 106 is snugly inserted with a tight fit. The hub 106, onto which the agitating and scraping dasher blades 7 are fitted, forms the bottom end of the dasher stem 6 which is provided with a handgrip 18 for extracting the same by hand from the can.

Under the abutment ring 8 a fixed, preferably funnel-shaped bottom member 15 is fastened, as by bolts 17 to a supporting ring 21 fastened to the cylindrical can wall 2. Fixed member 15 is provided with a spoutlike guide sleeve 16 onto which is rotatably mounted, for example on a ball bearing, a pulley 14 which is driven, for example through a belt, by a conventional motor of the machine (not shown). The pulley 14 is keyed to a shaft extension 11 the upper end of which is inserted into a blind hole bored axially in the lower part 206 of the hub 106 and provided with either a pair of through bores 9 or a conventional bayonet-type connection to facilitate separation of these elements. The shaft 11 is provided with a smaller transversal through bore and can thus be fastened by means of a transversal locking pin 10 so as to rotate jointly with the dasher unit 6–106–206–7 when the pulley 14 is driven in the mixing direction of the dasher (this direction depending upon the form of the blades 7).

The shaft extension 11 is provided with another extension, a screw spindle 12, which is axially mounted in a screw-threaded bushing 13, the directions of the screw threads being such that, when the pulley 14 is rotated so as to drive the dasher unit in ice-mixing direction, the latter will remain in the axial position as shown. When, on the contrary, said pulley 14 is rotated in reverse direction, the threads of the bushing 13, an integral part of the pulley 14, engage the threads of the spindle 12 which thus pushes upwardly the shaft extension 11, the slidable bottom disc 4 and the dasher unit supported thereby until the upper end of the lower smooth and smaller diameter end 112 of the spindle 12 has passed the threaded sleeve 13. In this position of the dasher unit, the pulley runs idle and may be stopped, and the ice cream which rests on the bottom disc, which has been pushed upwardly to substantially the level of the upper edge of the cylindrical wall 2, can be removed, and the dasher unit and the bottom disc be cleansed.

When the ice cream has been removed, the dasher unit and the bottom disc can be returned in the position as shown by driving the pulley 14 in dasher-mixing direction.

The driving of the pulley 14 in either direction, as required, may be obtained in the most simple manner by employing reversible electric motors, or by employing reversing gears.

Of course, the invention may be applied, with the necessary changes, to other types of ice cream machines and more generally to machines for batchwise mixing provided with fixed containers and a rotatable dasher unit. Also, the lifting and lowering of the plate 4 and the dasher unit can be effected by other conventional means, such as a hydraulic or pneumatic device, or a rack and pinion unit.

I claim:

1. A machine for batchwise mixing comprising a fixed cylindrical container, a dasher (7) having associated therewith a movable bottom plate (4), said bottom plate (4) and dasher (7) being slidably associated with a shaft (6), driving means (14) associated with said shaft beneath the bottom plate (4) for rotating the dasher (7) in a first direction and further means (12, 13) for rotating the dasher (7) and the bottom plate (4) axially of the shaft (6) to dispense the mix from the container (2) when the driving in the first direction is concluded.

2. A machine as claimed in claim 1, wherein the shaft (12) which extends beneath the bottom plate is screw threaded.

3. A machine as claimed in claim 1, wherein the dasher (7) and the bottom plate (4) include means permitting assembly thereof relative to the shaft.

4. A machine as claimed in claim 1, wherein the container is encompassed by a housing.

5. A machine as claimed in claim 4 wherein said housing is encompassed by coil means associated with a refrigeration unit.

* * * * *